Nov. 26, 1957   F. A. E. PORSCHE ET AL   2,814,503
AXLE SUSPENSION FOR AUTOMOTIVE VEHICLES
Filed Sept. 29, 1955                    2 Sheets-Sheet 1
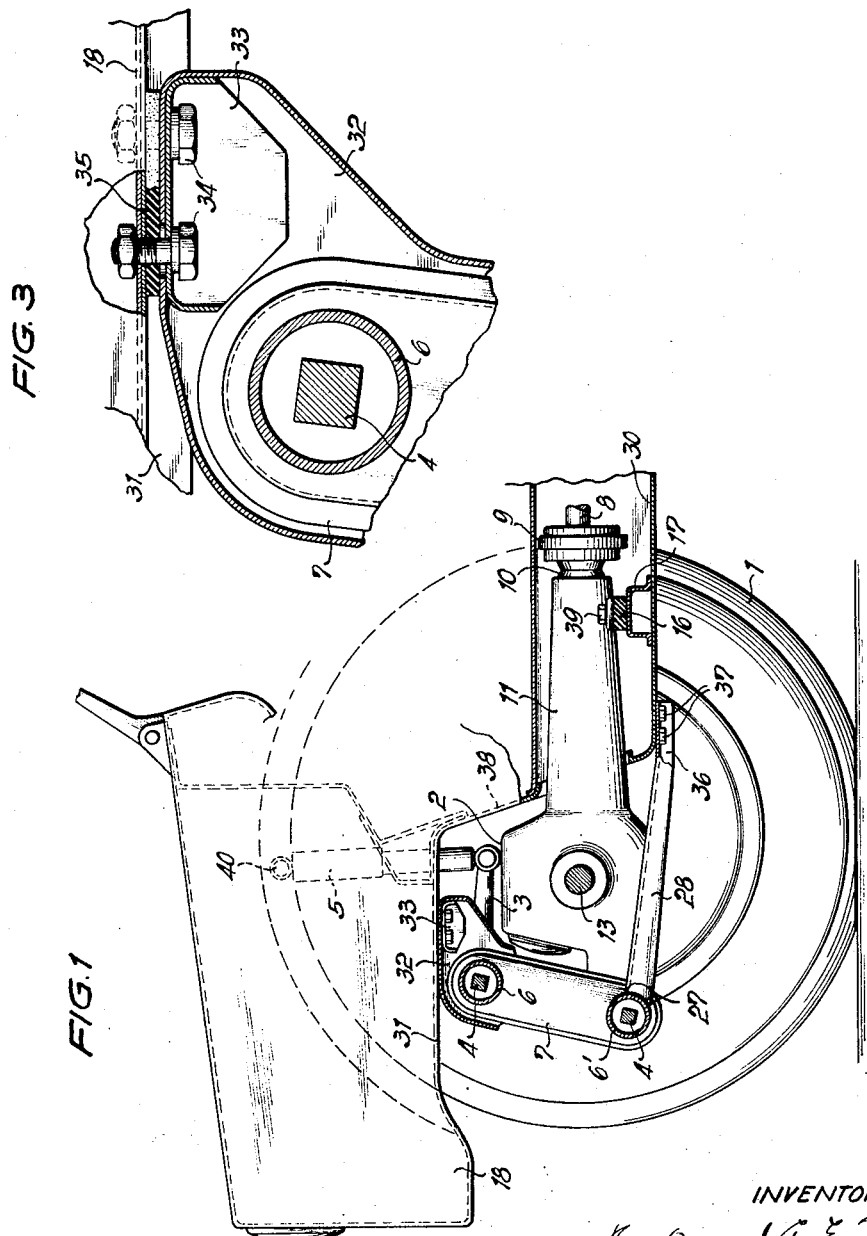
INVENTORS
Ferdinand A. E. Porsche
Wolfgang Eyb
By
Pennie Edmonds Morton Barrows & Taylor
Attorneys

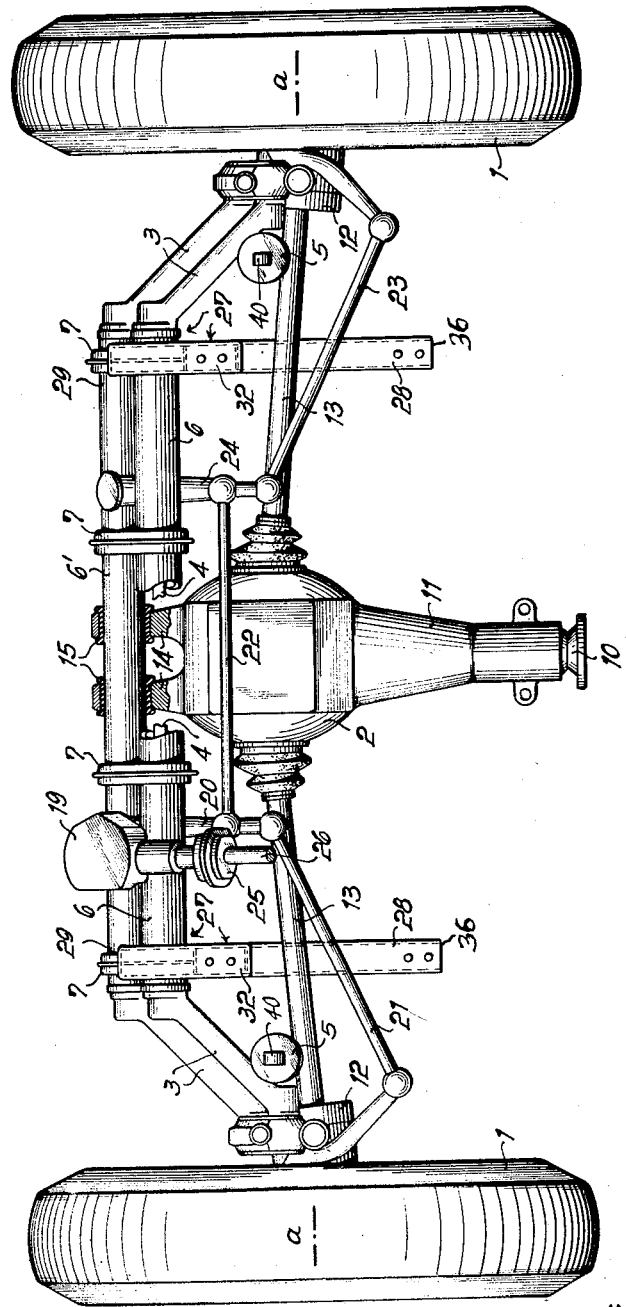

United States Patent Office 2,814,503
Patented Nov. 26, 1957

2,814,503

AXLE SUSPENSION FOR AUTOMOTIVE VEHICLES

Ferdinand A. E. Porsche, Stuttgart, and Wolfgang Eyb, Stuttgart-Zuffenhausen, Germany, assignors to Dr. Ing. h. c. F. Porsche K.-G., Stuttgart-Zuffenhausen, Germany Application September 29, 1955, Serial No. 537,508

Claims priority, application Germany October 9, 1954

5 Claims. (Cl. 280—124)

This invention relates to improvements in axle suspensions for automotive vehicles with self-supporting vehicle bodies in which the axle is guided by longitudinally-extending guiding members tributary to the action of coil springs and the suspension unit is detachably attached to the vehicle body by an auxiliary carrier or support.

In known constructions of this kind the axle and driving aggregate are mounted on an auxiliary carrier detachably secured to the main vehicle frame, the auxiliary carrier consisting of hollow longitudinal and cross members welded together to provide a rigid carrier framework. There is also known a design in which the axle and driving aggregate are mounted on an auxiliary carrier composed of U-shaped longitudinal and cross members. The main members of this auxiliary frame are strengthened by several struts so that a distortion-resisting structure is obtained which is secured to the bottom group of a distortion-resisting vehicle body, through the intermediary of elastic bearings. In all these constructions all the forces and moments exerted by the axle and driving aggregate are taken up solely by the auxiliary carrier, for which reason it is imperative that the latter possess a high resistance to bending and torsional stresses. These auxiliary carriers are, therefore, provided with numerous stiffening members thus increasing the cost of production, and their weight, unnecessarily.

In accordance with the invention these disadvantages are obviated by providing an auxiliary carrier, supporting the axle aggregate, which conjointly with the self-supporting vehicle body, produces a distortion-resisting frame system. Due to the fact that the bottom of the vehicle body is relied upon to provide a structure resisting bending and torsional stresses, a substantial simplification is obtained. Above all, the improved construction is such that only so much rigidity is imparted to the auxiliary carrier as is needed to enable it to absorb the part stresses to be exerted thereon as well as the local stresses arising during the construction and assembling operations. In that way only a few, simply designed, structural parts are needed resulting in a low-weight, albeit stable structure, which reliably takes up the stresses imposed thereon.

The auxiliary carrier, according to the invention, is secured to the vehicle body at four points widely spaced apart crosswise through the intermediary of inserted yieldable pads or buffers, whereby the stresses exerted by the axle aggregate are distributed over a large surface of the self-supported vehicle body bottom. In that way one can dispense with special oversize staying and stiffening parts on the bottom of the vehicle body. A further saving in structural parts results when the auxiliary carrier includes bearing tubes or tubular supports respectively surrounding torsion bar springs, and two struts extending substantially at right angles to the aforesaid tubes, the aforesaid struts being connected to the outer ends of the tubes, extending under the bottom of the vehicle body and being secured to the latter. In that way it is possible to use for the construction of the auxiliary carrier, parts which must in any case be present for supporting the wheel springs. In order to prevent the vehicle body from swaying relatively to the auxiliary carrier, the auxiliary carrier is fastened above and in front of the axis of the wheel axle as well as below and rearwardly of the wheel axis at two points each, in which way the upper attachment bearings take up the tensional and compression stresses of the axle whereas the lower attachment bearings are subjected substantially only to sliding thrusts.

The improved construction is described more in detail hereinafter in connection with the accompanying drawings which illustrate one exemplifying form or embodiment of the invention.

In the drawings:

Fig. 1 is a broken longitudinal elevational view partly in section through the forepart of an automotive vehicle, with driven front wheels, of an arrangement in accordance with the invention.

Fig. 2 is a top-plan view, partly in section, of the auxiliary carrier shown in Fig. 1, supporting an axle aggregate, and Fig. 3 is an enlarged broken longitudinal sectional view through a point at which the auxiliary carrier is journaled to the vehicle body.

Referring to Fig. 2 of the drawings, wheels 1 of a front-axle aggregate 2 are each guided and supported by two spaced superimposed suspension arms 3, swinging in the direction of travel or longitudinally of the vehicle and being tributary to the action of torsion bar springs 4 and shock absorbers 5. The springs 4 are spaced one above the other, as shown in Fig. 1, with their ends respectively fixed to the forward ends of the upper and lower arms 3. The torsion-bar springs 4 are respectively surrounded and supported by bearings tubes 6 and 6' extending throughout the entire vehicle width and propped relatively to each other by stays 7 constituted by cup-shaped pressed parts.

Power is transmitted to the wheels 1 from an engine (not shown) mounted in the rear part of the vehicle, via a Cardan shaft 8 connected to the driving shaft 10 of a differential gear train 11 by means of a detachable coupling 9. Starting from the differential gear train 11 the wheels are driven across front-axle link members 12 by means of axle shafts 13. At its front end the differential gear train 11 is secured to the lower tube 6' by means of supports 14 through the intermediary of rubber sleeve bearings 15. The opposite end of differential gear train designed in the form of a tubular extension extends into the lower portion of the vehicle body 18 and rests upon and is bolted to a crosswise extending girder 17 of the self-supported vehicle body 18 through the intermediary of a yieldable bearing 16 (Fig. 1).

The wheel-steering mechanism is mounted on the upper axle pipe 6 and comprises a steering gear train 19 by which the front wheels 1 are swung around by means of a steering lever 20, a tri-member steering linkage system 21, 22, 23, and a steering lever 24 likewise journaled on the axle pipe 6. The steering mechanism 19 is connected by means of a detachable coupling 25 with a steering column 26 which is fastened to the vehicle body 18.

The entire axle aggregate, inclusive of the axle aggregate 2 and the steering-mechanism parts is mounted on an auxiliary carrier 27 constituted by the tubes 6, 6', stays 7 and two struts 28. The struts 28, which have a U-shaped profile (Fig. 1), are respectively rigidly connected with the outer ends of the lower tube 6' and together with the axle pipes enclose almost a right angle. The auxiliary carrier is connected at four points to the vehicle body bottom 30 including the protruding extension 31 thereof which is located above the axle aggregate. For this purpose the two outer stays 7 of the tubes 6, 6' are each provided with a bracket 32 stiffened by a pressed-in cup 33 (Fig. 3). The brackets 32 are attached to the extension 31 of the vehicle body bottom 30 by two bolts 34 each, with interposition of a yieldable pad or washer 35. This kind of attachment is also provided for the struts 28, the ends 36 of which extend below the bottom 30 of the vehicle body 18 and are connected thereto by bolts 37.

The bearing tubes 6, 6' for supporting the torsion bar springs 4, the struts 28, the brackets 32, as well as the stays 7 are only given dimensions such as to enable them to take up the part stresses exerted thereon. In consequence of this the auxiliary carrier 27, constituted by the said parts, suffices per se for the stresses of the isolated front-axle unit. By assembling the auxiliary carrier 27 with the vehicle body 18 there is constituted, however, a distortion-resisting structure comprising the vehicle body bottom 30, the footrest 38, the bottom extension 31, the struts 28, the interconnected tubes or sleeves 6, 6', the stays 7, as well as the appurtenant brackets 32, which structure takes up both the static and the dynamic stresses of the axle aggregate. Since the attachment of the auxiliary carrier 27 to the vehicle body is made at points spaced far apart crosswise, said stresses are distributed over a large surface of the vehicle body 18.

In order to prevent the auxiliary carrier from swaying relatively to the vehicle body 18, the upper bearings constituted by the brackets 32 are disposed ahead of and above the axis a—a (Fig. 2) passing through the center of the wheels 1, and the lower bearings constituted by the struts 28 are disposed below and rearwardly of the wheel axles. As a result of this construction and arrangement, the brackets 32 take up the tensional and compression stresses while the struts 28 are subjected substantially only to slip or sliding stresses. Furthermore, the yieldable pads 35 of the brackets 32 and struts 28, respectively, are made with such a hardness that they permit only slight displacements of the auxiliary carrier with respect to the vehicle body, both in a vertical and in a horizontal direction.

To dismount the auxiliary carrier 27 the body is jacked up, the coupling 9 is loosened and disconnected from the Cardan shaft and the bolts or studs 39 are removed from the bearing 16 for the tubular extension of the differential gear train 11. The coupling 25 on the steering gear mechanism 19 and the upper bearing 40 of the shock absorber 5 are also disconnected, whereupon, after taking out the bolts 34 and 37, respectively, in the brackets 32 and the struts 28, the auxiliary carrier 27 can be rolled out from under the vehicle body on the wheels 1.

We claim:

1. In an automotive vehicle including a self-supporting vehicle body, the combination therewith of a front wheel suspension unit comprising essentially a pair of axles respectively carrying a wheel at the respective sides of the vehicle body, a pair of vertically-spaced forwardly-extending suspension arms for each axle, each arm having one end connected to said axle for supporting said axle and its wheel, a pair of vertically-spaced torsion bar springs extending transversely under the vehicle body, the ends of the upper and lower torsion bar springs being fixed respectively to the respective forwardly-extending ends of the upper and lower suspension arms of said pairs of suspension arms at the respective sides of the vehicle body, means for supporting the torsion bar springs including means located adjacent the respective ends of the torsion bar springs for securing them invertically-spaced relation, attachment means at the respective ends of the upper torsion bar spring for attaching the supporting means therefor to the vehicle body, a rearwardly-extending strut adjacent each end of the lower torsion bar spring, one end of each of said struts being attached to the supporting means for said lower torsion bar spring, and means for attaching the other end of each strut to the vehicle body at a point substantially spaced from said attachment means for the upper torsion bar spring, whereby a combined structure is provided by the self-supporting vehicle body and the attached suspension unit which is adapted to withstand the distortion and other stresses applied to the vehicle from the wheel axles in the operation of the vehicle.

2. An automotive vehicle as claimed in claim 1, in which the vehicle body includes a bottom wall portion extending directly over the upper torsion bar spring and said attachment means for the upper torsion bar spring attaches the latter to said bottom portion of the vehicle body.

3. An automotive vehicle as claimed in claim 2, in which the vehicle body includes a bottom portion rearwardly of the axis of the front wheels at an elevation below the axis of the front wheels, and in which said struts extend rearwardly below the axis of the front wheels with their said other ends attached to said bottom portion of the vehicle body rearwardly of the axis of the front wheels.

4. An automotive vehicle as claimed in claim 1, in which the attachment means at the respective ends of the upper torsion bar spring are attached to the body of the vehicle forward of the axis of the front wheels while the other ends of said struts are attached to the body of the vehicle rearwardly of the axis of the front wheels.

5. An automotive vehicle as claimed in claim 1, in which the body of the vehicle includes a bottom wall comprising a portion to the rear of the axis of the front wheels and below said axis, said bottom wall also including a portion extending upwardly and forwardly to a level above the axis of the front wheels and a portion extending forwardly at said level, said attachment means for the upper torsion bar being attached to said latter bottom portion, and said other ends of said struts being attached to said bottom portion rearwardly of the axis of the front wheels and below the level of said axis.

References Cited in the file of this patent

UNITED STATES PATENTS 2,132,759     Rabe  ---------------- Oct. 11, 1938

FOREIGN PATENTS 706,025     Great Britain ---------- Mar. 24, 1954